United States Patent [19]
Thomas

[11] Patent Number: 5,123,078
[45] Date of Patent: Jun. 16, 1992

[54] OPTICAL INTERCONNECTS

[75] Inventor: Michael E. Thomas, Milpitas, Calif.

[73] Assignee: National Semiconductor Corp., Santa Clara, Calif.

[21] Appl. No.: 611,909

[22] Filed: Nov. 9, 1990

[51] Int. Cl.$^5$ ............................................. G02B 6/12
[52] U.S. Cl. ................................. 385/130; 385/14; 385/129
[58] Field of Search ............... 350/96.11, 96.12, 96.15, 350/96.29; 385/14, 129, 130, 131, 132, 15, 16, 122

[56] References Cited

U.S. PATENT DOCUMENTS

| | | | |
|---|---|---|---|
| 4,693,543 | 9/1987 | Matsumura et al. | 350/96.11 |
| 4,730,330 | 3/1988 | Plihal et al. | 350/96.15 X |
| 4,861,126 | 8/1989 | Dautartas et al. | 350/96.11 |
| 4,760,568 | 4/1988 | Hine | 350/96.11 X |
| 4,901,321 | 2/1990 | Blondeaux et al. | 350/96.11 X |
| 4,919,507 | 4/1990 | Evans et al. | 350/96.12 X |
| 4,950,044 | 8/1990 | Makita | 350/96.15 X |
| 4,989,934 | 2/1991 | Zavracky et al. | 350/96.11 |

FOREIGN PATENT DOCUMENTS 0132206 1/1985 European Pat. Off.

OTHER PUBLICATIONS

"Optical Fiber—The Expanding Medium", Suzanne R. Nagel, IEEE Circuits and Devices Magazine, Mar., 1989, pp. 36-45.

"Major Initiatives for Optical Computing", John A. Neff, Optical Engineering, Jan., 1987, vol. 26, No. 1, pp. 2-9.

"Optical Interconnect for Wafer-Scale Silicon Systems", Jeff Fried et al., Proceedings of Jun. 21-22, 1984 V-MIC Conf., pp. 159-166.

"Survey of Silicon-Based Integrated Opticals", Dennis G. Hall, IEEE Computer, Dec., 1987, pp. 25-32.

Text Book entitled "Electromagnetics", Third Edition, John D. Kraus, McGraw-Hill Book Company, New York, specifically section 13-15, pp. 593-597.

Text Book entitled "Modern Optical Engineering", Warren J. Smith, McGraw-Hill Book Company, particularly section 9-8, pp. 236-239.

"Overview of Optical Interconnections", Fred J. Leonberger et al., Proceedings of the Technical Conference, Fifth Annual International Electronics Packaging Conference, Oct. 21-23, 1985, Orlando, Fla., pp. 334-342.

"Optical Interconnections Between Integrated Circuit Chips", John A. Neff, Proceedings of the Technical Conference, Fifth Annual International Electronics Packaging Conference, Oct. 21-23, 1985, Orlando, Fla., pp. 343-350.

*Primary Examiner*—Akm E. Ullah
*Assistant Examiner*—Phan T. Heartney
*Attorney, Agent, or Firm*—Irving R. Rappaport; William H. Murray; Frank M. Linguiti

[57] ABSTRACT

An optical interconnect structure, formed on a substrate, optically interconnects optoelectronic transmitting and receiving devices. The optical interconnect structure includes optical interconnects each of which includes a core member constructed of a material having a first predetermined index of refraction. The ends of the core members are chemically bonded either to an optoelectronic device or a core member of another optical interconnect. A cladding layer surrounds each core member. Each end of a cladding layer proximate to an optoelectronic device is chemically bonded to that device. The cladding layer is formed of a material having a second predetermined index of refraction, the magnitude of which is less than the magnitude of the first predetermined index of refraction.

18 Claims, 3 Drawing Sheets 5,123,078

OPTICAL INTERCONNECTS

BACKGROUND OF THE INVENTION

The present invention relates to interconnections between electronic components and more particularly to optical interconnections between optoelectronic components.

Delays in electronic circuits have been reduced to a point where interconnect delays are becoming the limiting factor inhibiting yet further increases in speed. Capacitive coupling of traditional metallic interconnects is a major contributor to such delays. The capacitive/inductive coupling between metal lines can also cause substantial signal attenuation even for short metal runs, resulting in diminished signal margins and a concomitant decrease in reliability.

Optical interconnects in conjunction with higher speed optoelectronic technology have been proposed to overcome the limitations of electronic systems using metal interconnects. Such optical interconnect schemes include planar wave guides and optical fibers; see, for example, the paper entitled "Optical Interconnection Between Integrated Circuit Chips" by John A. Neff, Fifth Annual International Electronics Packaging Conference, Proceedings of the Technical Conference, 1985, pp.: 343-50, and the paper entitled "Overview of Optical Interconnections" by Fred J. Lemberger and Paul N. Marshall, Fifth Annual International Electronics Packaging Conference, Proceedings of the Technical Conference, 1985, pp.: 334-42. Although optical interconnect schemes have been proposed, there is a need for an effective way to construct optical interconnects on and between optoelectronic devices.

SUMMARY OF THE INVENTION

It is therefore an object of the present invention to provide a method for constructing optical interconnects between optoelectronic devices.

It is another object of the present invention to provide a method for constructing optical interconnects between devices in an integrated circuit which is compatible with integrated circuit processing technology.

It is a further object of the present invention to provide a method for constructing fiber optic interconnects for interconnecting devices in an integrated circuit and interconnecting devices at a board level.

It is yet another object of the present invention to provide a method for constructing fiber optic interconnects with or without an opaque protective layer.

It is still another object of the present invention to provide a fiber optic interconnect system in which the interconnect support structure also forms a cladding which surrounds the core glass.

It is a further object of the present invention to construct a three dimensional array of fiber optic interconnects.

These and other objects are obtained by defining at least one optoelectronic transmitting device and at least one optoelectronic receiving device in or on a substrate. A first layer of support material is formed over the substrate. Vias are formed in the first layer of support material in order to expose the underlying optoelectronic transmitting and receiving devices. A layer of core glass, having a first predetermined index of refraction, is formed over the first layer of support material into contact with the underlying devices through the vias. The core glass is patterned, defined and etched into a first level of optical interconnects. A second layer of support material is formed over and around the core glass optical interconnects.

Vias are formed through the second support material layer thereby exposing surfaces of the underlying first level optical interconnects at predetermined locations. A second layer of core glass is then formed over the support material layer into the vias and into contact with the exposed surfaces of the underlying first level optical interconnects. The second layer of core glass is patterned, defined and etched into a second level of interconnect lines. The support material is then selectively etched away leaving only the core glass interconnects with free space therebetween.

A dielectric cladding layer is then formed around the core glass free space structure. The cladding layer has a second predetermined index of refraction which, in combination with the index of refraction of the core glass material, satisfies the requirements of an optical wave guide. An opaque protective jacket is then formed around the cladding layer. The resultant optical interconnect system comprises optical fiber guides each with a transparent core, transparent cladding and an opaque protective jacket.

Multiple levels of the optical interconnect system can be made by repeating the steps of forming the support layer and optical interconnects prior to etching the support layer material away. After the desired number of optical interconnect levels have been formed, all of the support layer material is selectively etched away. The remaining core glass is then covered by the cladding layer and protective jacket.

In an alternate embodiment of the present invention, the support layer material is a glass having the desired index of refraction. In this embodiment, the support glass material is not etched away and the resultant optical interconnects comprise a transparent core of core glass material surrounded by a transparent cladding of support glass material.

In another alternate embodiment of the present invention, after the support material is selectively etched away leaving only the core glass interconnects with free space therebetween, a dopant is placed on the outer surfaces of the core glass interconnects. The dopant is then thermally diffused into the core glass material forming a graded index of refraction from the surface inward. This graded region has a lower index of refraction than the core material and facilitates a smooth undulating propagation of light through the interconnects.

DETAILED DESCRIPTION OF THE PREFERRED EMBODIMENT

Figure 1A:
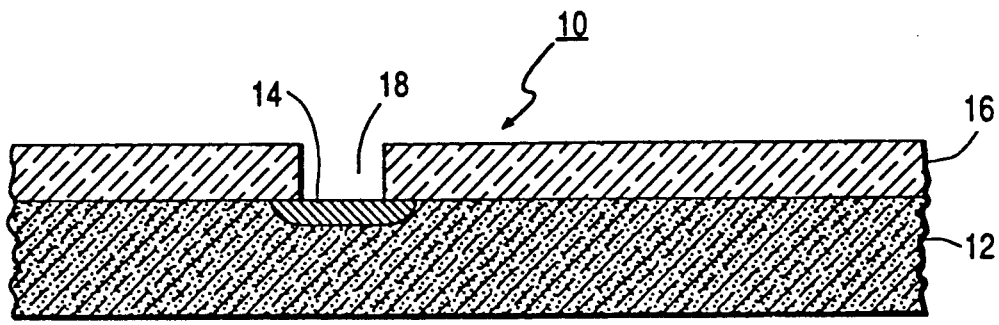
FIGS. 1A through 1I are diagrammatic cross-sectional representations of processing stages of a preferred method for constructing an optical interconnect system in accordance with the present invention.

Although a specific form of the invention has been selected for illustration in the drawing, and the following description is drawn in specific terms for the purpose of describing this form of the invention, this description is not intended to limit the scope of the invention which is defined in the amended claims.

Referring to FIG. 1, particularly to FIG. 1A, there is shown in diagrammatic cross-sectional form, a portion of a substrate, generally designated 10, including at least one optoelectronic emitting device 14, such as, for example, a GaAs light emitting device, disposed in the substrate 12. At least one optoelectronic detecting device (not shown), for example a GaAs photodetection device, is also disposed in the substrate 12. The optoelectric emitting and detecting devices can be either attached to or formed in an appropriate substrate. For the purposes of this detailed description it is assumed that the optoelectronic devices are formed in a semiconductor substrate, for example, gallium arsenide. It should also be noted that the opto-electronic emitting and detecting devices could be attached to a multi-chip carrier which devices may also be optically connected using the optical interconnects of the present invention.

A layer 16 of support material is formed on the surface of the substrate 12. In the preferred embodiment, the layer 16 comprises a layer of a glass material which is formed preferably by chemical vapor deposition (CVD) to a predetermined thickness, preferably 10,000 angstroms. It should be noted that the support layer 16 can also comprise a metal, polymeric material, or any material which has sufficient mechanical strength to support a core glass material, has thermal integrity during subsequent processing steps, and is substantially non-reactive with the core glass material. In the preferred embodiment, the support layer 16 comprises an undoped CVD silicate glass.

Vias 18 are then defined and etched through the support layer 16 in order to expose underlying optoelectronic transmitters and receivers. The vias 18 are preferably patterned using mask and photoresist techniques which are known in the art. The vias 18 are then etched through the support layer 16 using an etchant which attacks the support layer material but which is substantially unreactive with the substrate material and which is not detrimental to the underlying optoelectronic device. Since the support layer 16 comprises an undoped silicate glass, it is preferred that the etchant be a plasma etch gas comprising a $CHF_3/O_2$ mixture; preferably five parts $CHF_3$ to one part $O_2$.

Figure 1B:
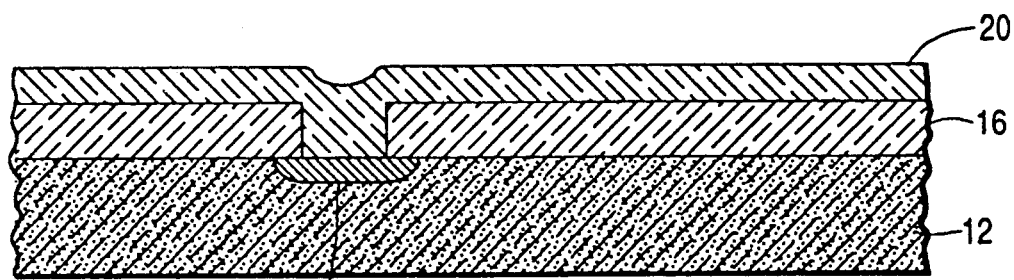
Figure 1C:
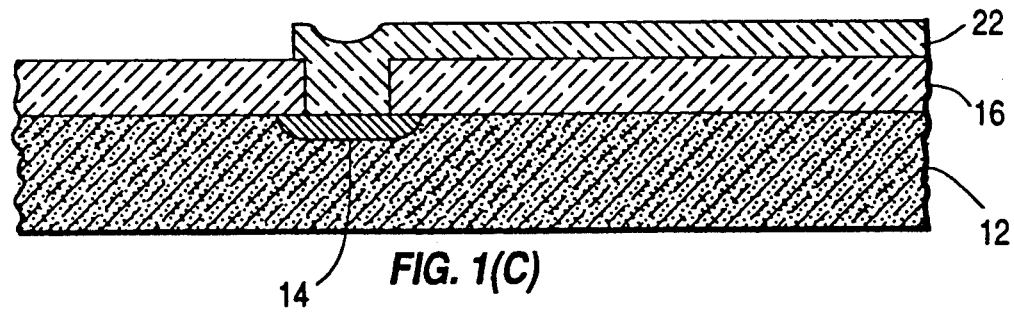
Figure 1D:
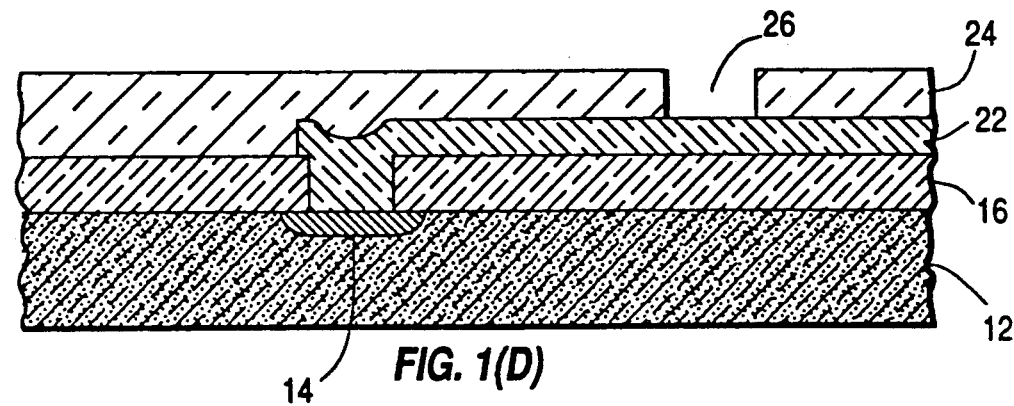

Referring now to FIG. 1B, a layer 20 of core glass, having a predetermined index of refraction $n_1$, is deposited over the support layer 16 into the vias 18 in contact with the underlying optoelectronic devices. In the preferred embodiment, the core glass comprises silicon nitride which is preferably deposited by CVD as known in the art, to a predetermined thickness, preferably approximately 1 micron. The core glass material could also be a borophosphosilicate glass (BPSG).

The core glass layer 20 is then patterned, defined and etched into optical interconnects 22 (see FIG. 1C) using mask and photoresist techniques which are known in the art. The core glass layer 20 is etched into the defined optical interconnect pattern using a first etchant, which can be either a fluorinated or chloronated plasma such as a $BCl_3/Cl_2/CF_4$ plasma which attacks the core glass material at a faster rate than it attacks the support layer material.

A second support layer 24 is formed over the core glass interconnects 22 to a predetermined thickness, preferably approximately 10,000 angstroms, using CVD as known in the art. The material of the second support layer 24 is preferably the same as that of the first support layer 16. A second set of vias 26 is then defined and etched through the second support layer 24 in order to expose surfaces of the underlying core glass interconnects 22 at predetermined locations. The vias 26 are patterned and defined using conventional mask and photoresist techniques and are etched using a second etchant, preferably $CHF_3/O_2$ or a wet etchant containing buffered HF, which attacks the support layer material at a faster rate than it attacks the core glass material.

Figure 1E:
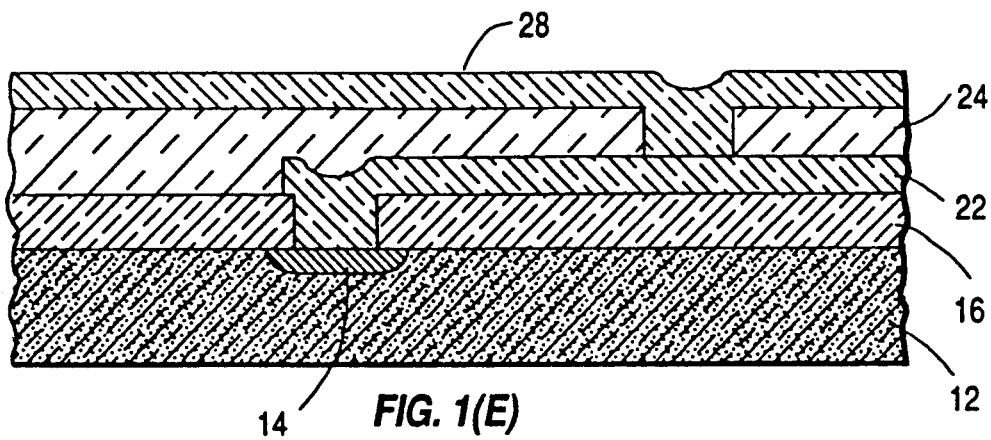
Figure 1F:
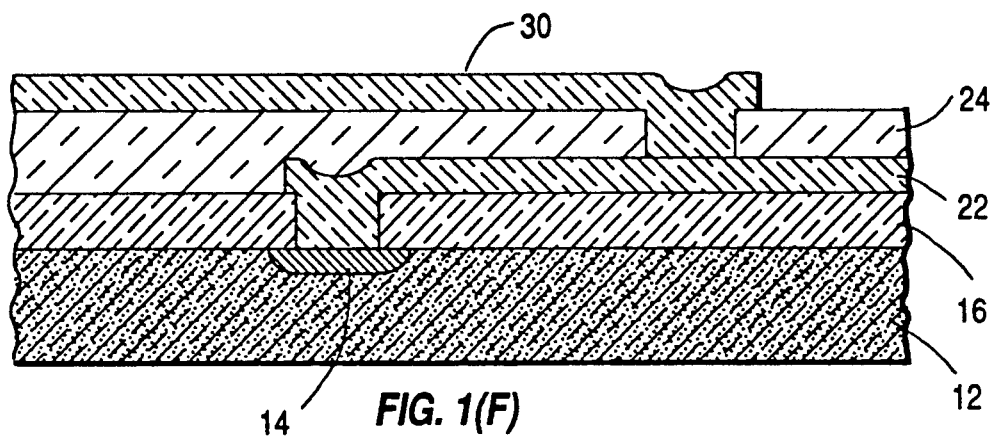
Figure 1G:
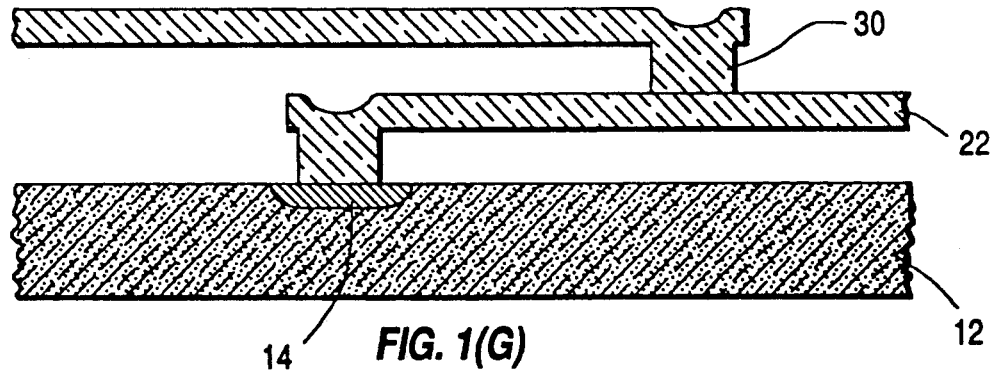

A second level of core glass optical interconnects is constructed by forming a second layer 28 of core glass material over the second support layer 24 into the second set of vias 26 and contacting the exposed surfaces on the underlying core glass interconnects 22 as shown in FIG. 1E. The material of the second core glass layer 28 is the same as that of the first core glass layer, having an index of refraction $n_1$. The second core glass layer 28 is then formed into a second set of core glass optical interconnects 30, see FIG. 1F, using conventional mask and photoresist techniques to define the second interconnect pattern and using the first etchant which attacks the core glass material at a faster rate than it attacks the support layer material. Referring now to FIG. 1G, the support layer material is etched out of the structure using the second etchant, leaving the optical interconnects 22 and 30 surrounded by free space.

Figure 1H:
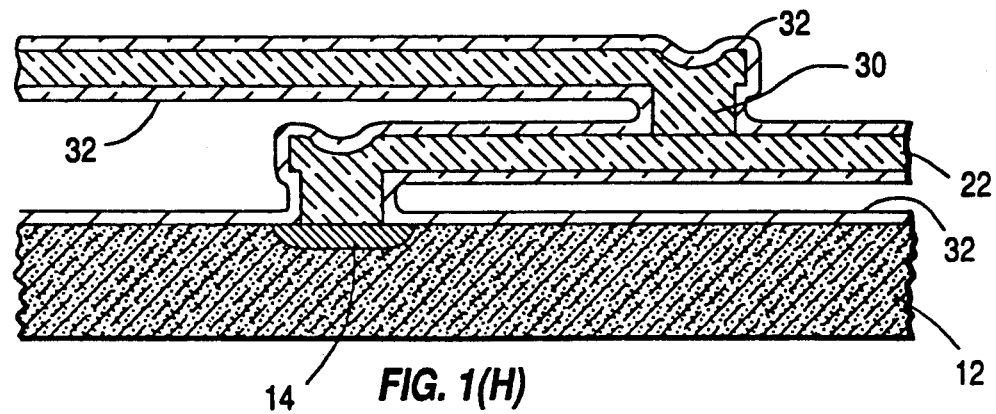

As shown in FIG. 1H, a cladding layer 32 is formed around the core glass interconnects 22 and 30 preferably using CVD. The cladding layer material preferably comprises undoped silicate glass (USG), which has an index of refraction $n_2$ which is less than the index of refraction $n_1$ of the core glass material, in order to satisfy the requirements of an optical wave guide. The cladding thickness is selected to substantially eliminate the escape of light from the core glass material as is known in the fiber optic art.

Figure 1I:
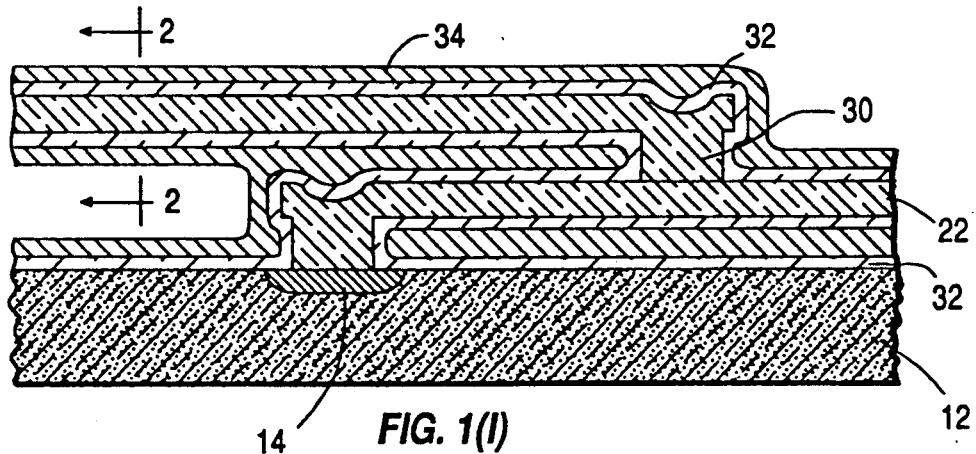
Figure 2:
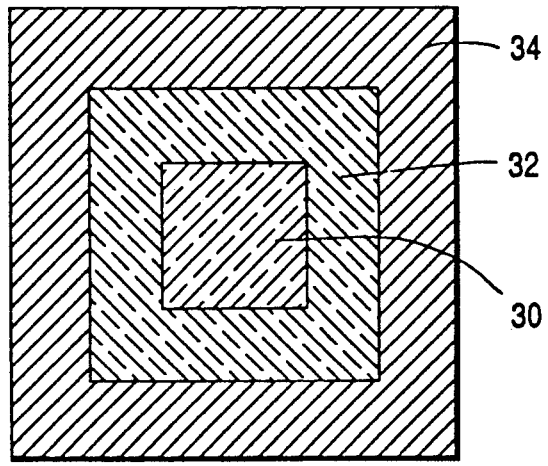
FIG. 2 is a cross-sectional view of an optical interconnect line taken along lines 2—2 of FIG. 1I.

Referring to FIG. 2, an opaque protective jacket 34 is formed around the cladding layer 32. In the preferred embodiment, the protective jacket comprises a metal, preferably a multi-layer metal film of tungsten over a sputtered titanium-tungsten alloy, which is formed to a thickness of approximately 2,000 angstroms. FIG. 2 depicts, in diagrammatic form, a cross-section of an optical interconnect 38 taken along line 2—2 of FIG. 1I. As can be seen, the optical interconnect 38 comprises a core glass material 30 having an index of refraction $n_1$ which is surrounded by a cladding layer 32 having an index of refraction $n_2$. The cladding layer 32 is surrounded by a protective jacket 34.

In optical wave guides of the type shown in FIG. 2, it is preferred that the index of refraction $n_1$ of the core glass material be slightly greater than the index of refraction $n_2$ of the surrounding cladding material. This relationship is explained more fully in the textbook entitled "Electromagnetics" by John D. Kraus, Third Edition, 1984, McGraw-Hill, and in particular pages 593-596 of that textbook, the teachings of which are incorporated in this detailed description by reference as if fully set forth herein.

Figure 3:
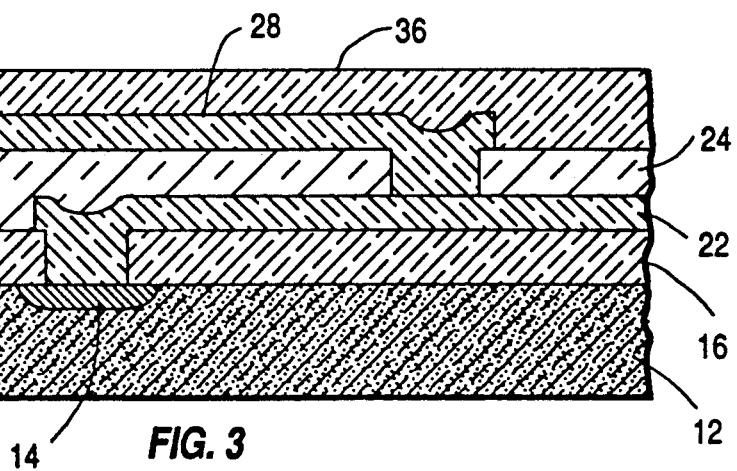
FIG. 3 is a diagrammatic cross-sectional representation of a processing stage of an alternate preferred method for constructing an optical interconnect system in accordance with the present invention.

In an alternate preferred embodiment, the optical interconnects can be formed by using a support layer material having an index of refraction $n_2$. In this alternate preferred embodiment, the processing steps depicted in FIGS. 1A through 1F are performed as previously described using a support layer material having an index of refraction $n_2$. In this alternate embodiment, the support layer material is preferably undoped silicate glass (USG). Referring to FIG. 3, a layer of support material, having an index of refraction $n_2$, is formed over the uppermost level of the core glass interconnects thereby causing the core glass interconnects, which have an index of refraction $n_1$, to be surrounded by support glass having an index of refraction $n_2$ as necessary to satisfy the requirements of an optical wave guide. In this alternate preferred embodiment, it is not necessary to etch out the support glass material. If desired, a continuous layer of opaque material can be formed over the complete structure to inhibit optical noise from external sources.

In another alternate preferred embodiment, the processing steps depicted in FIGS. 1A through 1G are performed as previously described. A material, which changes the index of refraction of the core glass material, is diffused into the core glass material through the surfaces of the core glass interconnects. For example, a dopant is placed on the outer surfaces of the core glass interconnects 22 and 30. In the preferred embodiment, the material of the core glass interconnects is phosphosilicate glass (PSG) having an index of refraction $n_1$ and the dopant is boron preferably from a diborane source. The boron dopant is then diffused into the core glass material preferably by heating. This causes a concentration gradient, and a concomitant increasing index of refraction gradient from the outer surface of the interconnects inward. If desired, a continuous layer of opaque material can be formed around the interconnects as depicted in FIG. 1I.

In still another alternate preferred embodiment, the increasing index of refraction gradient from the surface of the optical interconnects inward, is created by forming a cladding layer 32, which contains a dopant, around the interconnects 22 and 30 as shown in figure 1H. The dopant from the cladding layer 32 is diffused into the core glass material of the interconnects preferably by heating.

In yet another alternate preferred embodiment, the increasing index of refraction gradient is created by generating a graded index of refraction material during the cladding deposition process. For example, while forming the cladding layer 32 (see FIG. 1H) the dopant, for example boron or phosphorous in the deposited glass, can be increased by increasing the amount of dopant gas in the CVD process with time.

It will be understood that various changes in the details, materials and arrangement of the parts which have been described and illustrated in order to explain the nature of this invention, may be made by those skilled in the art without departing from the principles and scope of the invention as expressed in the following claims.

I claim:

1. An optical interconnect structure formed on a substrate having at least one optoelectronic transmitting device and at least one optoelectronic receiving device associated therewith, said optical interconnect structure including at least one optical interconnect comprising:
   a) a core member, each end of which is chemically bonded to an optoelectronic device, said core member comprising a material having a first predetermined index of refraction; and
   b) a cladding layer surrounding said core member, each end of which is also chemically bonded to said optoelectronic device, said cladding layer comprising a material having a second predetermined index of refraction the magnitude of which is less than the magnitude of the first predetermined index of refraction.

2. The optical interconnect structure in accordance with claim 1 additionally comprising at least a second level interconnect structure including at least one optical interconnect comprising:
   (a) a core member, each end of which is chemically bonded to either an optoelectronic device or a core member of an optical interconnect in an underlying first optical interconnect structure, said core member comprising a material having an index of refraction, the magnitude of which is substantially equal to the magnitude of the first predetermined index of refraction; and
   (b) wherein said cladding layer also surrounds the core member of each optical interconnect of said second optical interconnect structure.

3. The optical interconnect structure in accordance with claim 2 additionally comprising a protective layer surrounding said cladding layer.

4. The optical interconnect structure in accordance with claim 2 wherein said substrate is a semiconductor substrate.

5. The optical interconnect structure in accordance with claim 4 wherein said optoelectronic devices comprise gallium arsenide devices.

6. The optical interconnect structure in accordance with claim 2 wherein said substrate comprises a multi-chip carrier.

7. The optical interconnect structure in accordance with claim 1 wherein at least a portion of at least one of said interconnects, intermediate the ends thereof, is spaced from said substrate and from adjacent interconnects.

8. The optical interconnect structure in accordance with claim 2 wherein at least a portion of at least one interconnect in said at least second level interconnect structure, intermediate the ends of said at least one interconnect, is spaced from adjacent interconnects.

9. An optical interconnect structure in accordance with claim 3 wherein at least a portion of at least one interconnect, intermediate the ends thereof, is spaced from said substrate and from adjacent interconnects.

10. The optical interconnect structure in accordance with claim 3 wherein at least a portion of at least one interconnect in said at least a second level interconnect structure, intermediate the ends of said interconnect is spaced from adjacent interconnects.

11. The optical interconnect structure in accordance with claim 2 wherein said substrate comprises a printed circuit board.

12. An optical interconnect structure formed on a substrate having at least one optoelectronic transmitting device and at least one optoelectronic receiving device associated therewith, said optical interconnect structure including at least one optical interconnect comprising a core member optically connected to at least one of said devices, said core member comprising a center portion having a first predetermined index of refraction, and an outer portion having a graded index of refraction the magnitude of which increases from a value, proximate the outer surface, which is less than the magnitude of the first predetermined index of refraction, to a value, proximate the center portion, which is substantially equal to the magnitude of the first predetermined index of refraction.

13. The optical interconnect structure in accordance with claim 12 additionally comprising a second optical interconnect structure disposed over said optical interconnect structure, said second optical interconnect structure including at least one of said optical interconnects, each end of which is either connected to a central portion of the core member of an optical interconnect of said underlying optical interconnect structure or to an optoelectronic device.

14. The optical interconnect structure in accordance with claim 13 wherein said substrate comprises a semiconductor substrate.

15. The optical interconnect structure in accordance with claim 14 wherein said optoelectronic devices comprise gallium arsenide devices.

16. The optical interconnect structure in accordance with claim 13 wherein said substrate comprises a multi-chip carrier.

17. The optical interconnect structure in accordance with claim 13 additionally comprising a protective layer surrounding each of said optical interconnects.

18. The optical interconnect structure in accordance with claim 13 wherein said substrate comprises a printed circuit board.

* * * * *